(12) United States Patent
Kostański et al.

(10) Patent No.: US 11,592,115 B2
(45) Date of Patent: Feb. 28, 2023

(54) FLUID VALVE

(71) Applicant: Rosemount Aerospace Inc., Burnsville, MN (US)

(72) Inventors: Piotr Kostański, Iwiny (PL); Tomasz Wilk, Wroclaw (PL)

(73) Assignee: Rosemount Aerospace Inc., Burnsville, MN (US)

( * ) Notice: Subject to any disclaimer, the term of this patent is extended or adjusted under 35 U.S.C. 154(b) by 46 days.

(21) Appl. No.: 16/686,901

(22) Filed: Nov. 18, 2019

(65) Prior Publication Data

US 2020/0166145 A1 May 28, 2020

(30) Foreign Application Priority Data

Nov. 22, 2018 (EP) ..................................... 18461627

(51) Int. Cl.
*F16K 11/08* (2006.01)
*F16K 11/083* (2006.01)
*F16K 27/06* (2006.01)

(52) U.S. Cl.
CPC ........ *F16K 11/0836* (2013.01); *F16K 27/062* (2013.01); *Y10T 137/86863* (2015.04); *Y10T 137/86871* (2015.04)

(58) Field of Classification Search
CPC ...... F16K 27/062; F16K 5/04; F16K 31/5245; F16K 11/083–0836; Y10T 137/86871; Y10T 137/86863; Y10T 137/88782; Y10T 137/87909; Y10T 137/86638; Y10T 137/86646; Y10T 137/86654; Y10T 137/86662; Y10T 137/86533;

(Continued)

(56) References Cited

U.S. PATENT DOCUMENTS 616,827 A * 12/1898 Deisher .............. B61D 27/0036
237/40
1,061,825 A * 5/1913 Dewey .................... F23D 14/64
431/280

(Continued)

FOREIGN PATENT DOCUMENTS

DE 801827 C 1/1951
FR 1047328 A 12/1953
WO WO-2015119008 A1 * 8/2015 ............. F16K 5/163

OTHER PUBLICATIONS

Extended European Search Report for European Patent Application No. 18461627.4, dated Apr. 26, 2019, 7 pages.

*Primary Examiner* — Craig J Price
(74) *Attorney, Agent, or Firm* — Kinney & Lange, P.A.

(57) ABSTRACT

A fluid valve comprises a valve housing having at least one fluid inlet and at least one fluid outlet and having a valve axis. At least one of the inlet and outlet is arranged in a wall extending circumferentially about the valve axis. The valve further comprises a rotary valve body arranged within the valve housing for rotation about the valve axis. The rotary valve body comprises a frusto-conical valve body wall and at least one inlet or outlet valve body opening through the valve body wall, the valve body being rotatable about the valve axis so as selectively to place the valve housing inlet and valve housing outlet into fluid communication via the at least one valve body opening. The at least one inlet or outlet valve body opening is a slot which extends in the direction of the valve axis.

7 Claims, 10 Drawing Sheets

(58) Field of Classification Search
CPC ..... Y10T 137/86541; Y10T 137/86549; Y10T 137/86566; B61D 27/0036–0063
USPC ................ 251/207–209, 310; 137/876, 887, 137/625.15, 625.16, 625.17, 625.19, 137/625.21–625.24
See application file for complete search history.

(56) References Cited

U.S. PATENT DOCUMENTS

| | | | | |
|---|---|---|---|---|
| 1,327,252 | A * | 1/1920 | Paulson | B60K 15/077 137/625.19 |
| 1,491,115 | A * | 4/1924 | Taylor | F04F 5/34 417/186 |
| 1,561,127 | A * | 11/1925 | Vallier | F16K 41/026 137/625.16 |
| 1,597,523 | A * | 8/1926 | Grund | F16K 11/083 137/625.16 |
| 1,958,228 | A * | 5/1934 | Beardsley | C10B 55/00 196/137 |
| 2,001,320 | A * | 5/1935 | Williamson | F16K 11/12 137/555 |
| 2,127,679 | A * | 8/1938 | Dudley | F15B 13/04 137/625.23 |
| 2,160,741 | A * | 5/1939 | Jensen | B67D 7/06 137/246.14 |
| 2,198,386 | A * | 4/1940 | Hiester | F16K 11/08 137/625.11 |
| 2,332,882 | A * | 10/1943 | Abbatiello | F28D 7/1646 165/301 |
| 2,498,846 | A * | 2/1950 | Ball | F01L 7/08 123/41.16 |
| 2,621,886 | A * | 12/1952 | Mueller | F16K 11/085 137/625.47 |
| 2,630,325 | A * | 3/1953 | Reynolds | C02F 1/42 137/67 |
| 2,893,429 | A * | 7/1959 | Schaffer | F16K 5/0271 251/185 |
| 2,973,181 | A * | 2/1961 | Johnson | F16K 3/34 251/172 |
| 3,108,779 | A * | 10/1963 | Anderson | F16K 5/0471 251/309 |
| 3,383,088 | A * | 5/1968 | Duffey | F16K 39/06 251/317 |
| 3,498,317 | A * | 3/1970 | Duffey | F16K 5/0271 137/375 |
| 3,506,239 | A * | 4/1970 | Jesser | F16K 5/04 251/310 |
| 3,700,003 | A * | 10/1972 | Smith | F16K 5/0264 137/614.17 |
| 3,704,003 | A * | 11/1972 | Harter | F16K 5/04 251/312 |
| 3,721,265 | A * | 3/1973 | Hoffland | F16K 11/08 137/625.47 |
| 3,771,765 | A * | 11/1973 | Scapes | F16K 5/0278 251/310 |
| 3,834,372 | A | 9/1974 | Turney | |
| 3,906,997 | A * | 9/1975 | Scaglione | F16K 5/00 137/614.16 |
| 3,974,869 | A * | 8/1976 | Abe | F16K 5/0271 251/309 |
| 4,281,619 | A * | 8/1981 | Frick | B05C 5/0233 118/325 |
| 4,410,003 | A | 10/1983 | Sandling | |
| 4,510,966 | A * | 4/1985 | Parsons, Jr. | F16K 5/166 277/362 |
| 4,522,233 | A * | 6/1985 | Mojadad | F16K 11/083 137/625.47 |
| 4,535,803 | A * | 8/1985 | Price | F16K 5/0285 251/312 |
| 4,605,036 | A * | 8/1986 | Smith | F16K 5/0435 137/327 |
| 4,610,266 | A * | 9/1986 | Sandling | F16K 5/0485 137/315.2 |
| 5,251,663 | A * | 10/1993 | Christianson | F16K 11/0853 137/625.47 |
| 5,402,983 | A * | 4/1995 | Bernhardt | F16K 5/0285 251/214 |
| 5,590,681 | A * | 1/1997 | Schaefer | B22D 18/04 251/368 |
| 5,839,399 | A * | 11/1998 | Luce | F01L 7/028 123/80 BB |
| 5,950,664 | A * | 9/1999 | Battaglia | F16K 39/06 137/454.6 |
| 6,192,935 | B1 * | 2/2001 | Schroeder | B67D 1/0081 137/312 |
| 6,539,899 | B1 | 4/2003 | Piccirilli et al. | |
| 7,089,960 | B2 | 8/2006 | Maruta | |
| 7,789,106 | B2 * | 9/2010 | Reck | F16K 11/0873 137/625.47 |
| 7,886,769 | B2 | 2/2011 | Muller | |
| 9,097,354 | B2 * | 8/2015 | Semmes | F16K 11/0856 |
| 9,523,434 | B2 * | 12/2016 | Nagahama | F16K 5/0471 |
| 9,631,731 | B2 * | 4/2017 | Davis | F16K 11/083 |

\* cited by examiner

FLUID VALVE

TECHNICAL FIELD

The present disclosure relates to fluid valves, for example to three-port, three-position fluid valves.

BACKGROUND

Fluid valves typically comprise a valve housing having inlet and outlet ports and a rotary valve body which is rotatable within the valve housing to selectively open and close ports in the valve housing and thus direct fluid between different ports or to prevent fluid flow between the ports. An example of such a valve is a 3-port, 3 position valve. In such a valve, there is typically a rotary ball element with cylindrical channels formed therein which changes the connection of the ports. Typically the ports are spaced apart by 90 degrees, and each position change of the valve requires a 90 degree rotation of the ball element, and to cover all three rotational positions of the valve it is necessary to allow for 180 degrees of rotation in total. This large rotational movement required may limit the number of actuator types which may be used to rotate the ball element. Also, it may mean that movement of the ball element between positions may be slow.

SUMMARY

From a first aspect, the disclosure provides a fluid valve comprising a valve housing having at least one fluid inlet and at least one fluid outlet and having a valve axis. At least one of the inlet and the outlet are arranged in a wall extending circumferentially about the valve axis. The valve further comprises a rotary valve body arranged within the valve housing for rotation about the valve axis. The rotary valve body comprises a frusto-conical valve body wall and at least one inlet or outlet valve body opening through the valve body wall. The valve body is rotatable about the valve axis so as selectively to place the valve housing inlet and valve housing outlet into fluid communication via the at least one valve body opening. The at least one inlet or outlet valve body opening is a slot which extends in the direction of the valve axis (A).

The aspect ratio of the slot, defined as the ratio of its axial length to circumferential width, may be at least 3:1. In some embodiments, the aspect ratio may be at least 4:1, for example at least 5:1.

The valve may further comprise a sealing element interposed between the valve housing and the valve body wall. The sealing element has a frusto-conical inner surface for receiving the frusto-conical valve body wall and a sealing element opening in that wall and aligned with the valve housing inlet or outlet.

The sealing element may comprise an open ended frusto-conical sleeve.

The valve housing may have a frusto-conical inner surface for receiving the sealing element.

The sealing element may be made from a low friction material, for example PTFE.

The valve may further comprise respective cylindrical fluid connectors mounted to the at least one valve housing inlet and outlet for conducting fluid to and from the valve housing.

The cross sectional flow area of a respective connector may be substantially the same as the cross sectional area of the corresponding valve body opening.

The fluid connector may extend through the valve housing wall and into sealing engagement with the sealing element. The connector may optionally extend into a corresponding seal element opening.

In some embodiments, the valve housing inlet may not be closable by the valve body.

The valve housing inlet may be arranged at one axial end of the valve housing and be aligned axially of the valve housing.

The valve may further comprise a biasing element mounted at one axial end of the valve housing for biasing the valve body axially into the valve housing and into contact with the sealing element.

The biasing element may optionally comprise one or more annular springs.

The biasing element may be mounted between the valve housing inlet and one end of the valve body.

In some embodiments, all inlets and outlets to the valve body may be in the circumferential wall of the valve body.

The valve housing may comprise an axial opening at an end thereof. The opening may be aligned with a coupling on the valve body for coupling the valve body to an actuator.

The disclosure also extends to a fluid valve assembly comprising a fluid valve as described above and an actuator coupled to the valve body for rotating the valve body.

The actuator may, for example, be a rotary solenoid, a linear solenoid, a stepper motor, a hydraulic actuator or a pneumatic actuator.

BRIEF DESCRIPTION OF DRAWINGS

Some embodiments of the disclosure will now be described by way of example only with reference to the accompanying drawings, in which.

DETAILED DESCRIPTION

Figure 1:
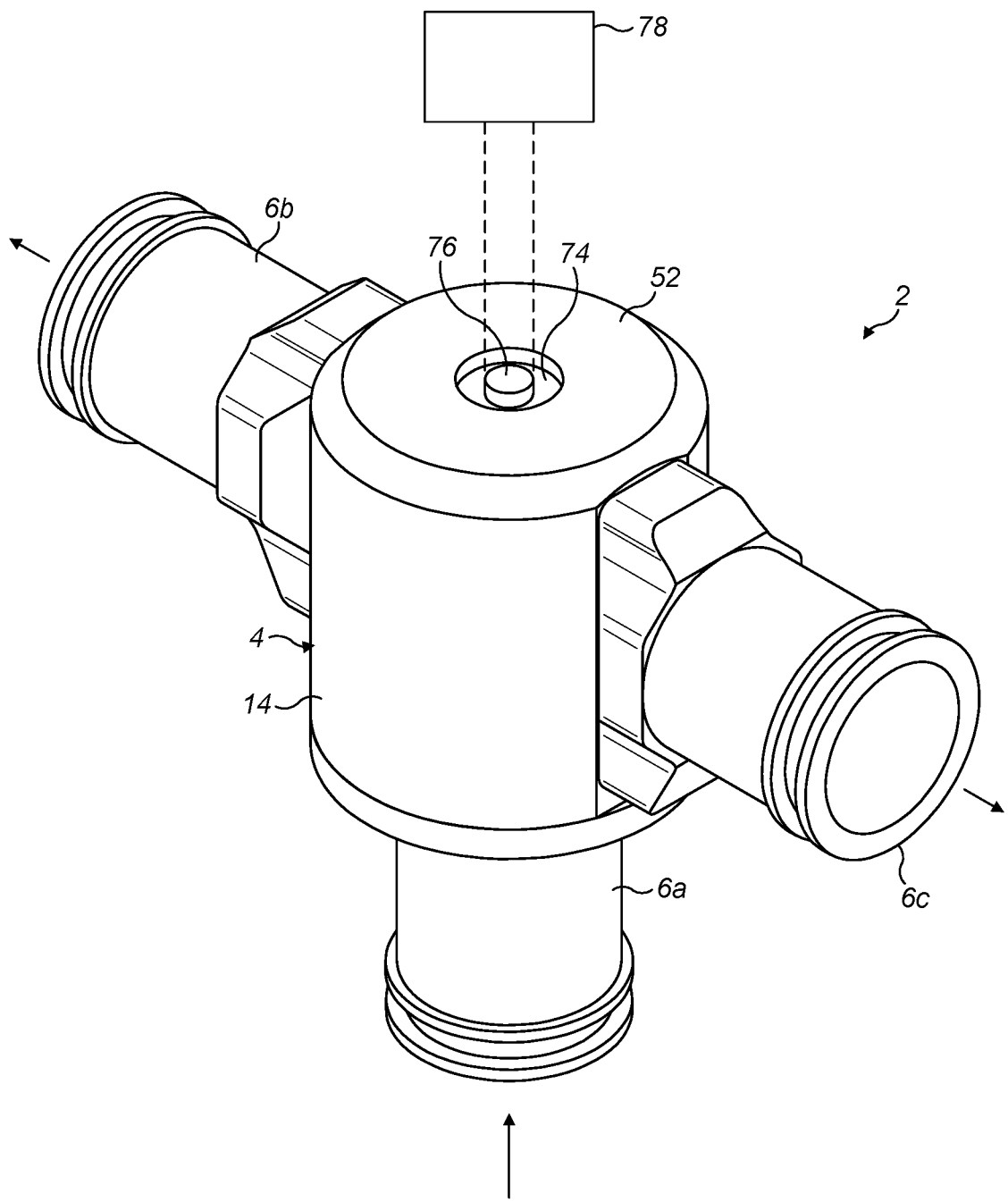
FIG. 1 shows a perspective view of an embodiment of three port fluid valve in accordance with the disclosure.

With reference to FIGS. 1 to 8, a first fluid valve 2 in accordance with the disclosure is illustrated. The fluid valve 2 comprises a valve housing 4, having a plurality of fluid connectors 6a, 6b, 6c mounted thereto. In this embodiment, the connector 6a is a fluid inlet connector while the connectors 6b and 6c are fluid outlet connectors. Thus in use, the fluid inlet connector 6a may be coupled to a source of fluid and the fluid outlet connectors be coupled to systems requiring fluid.

Figure 2:
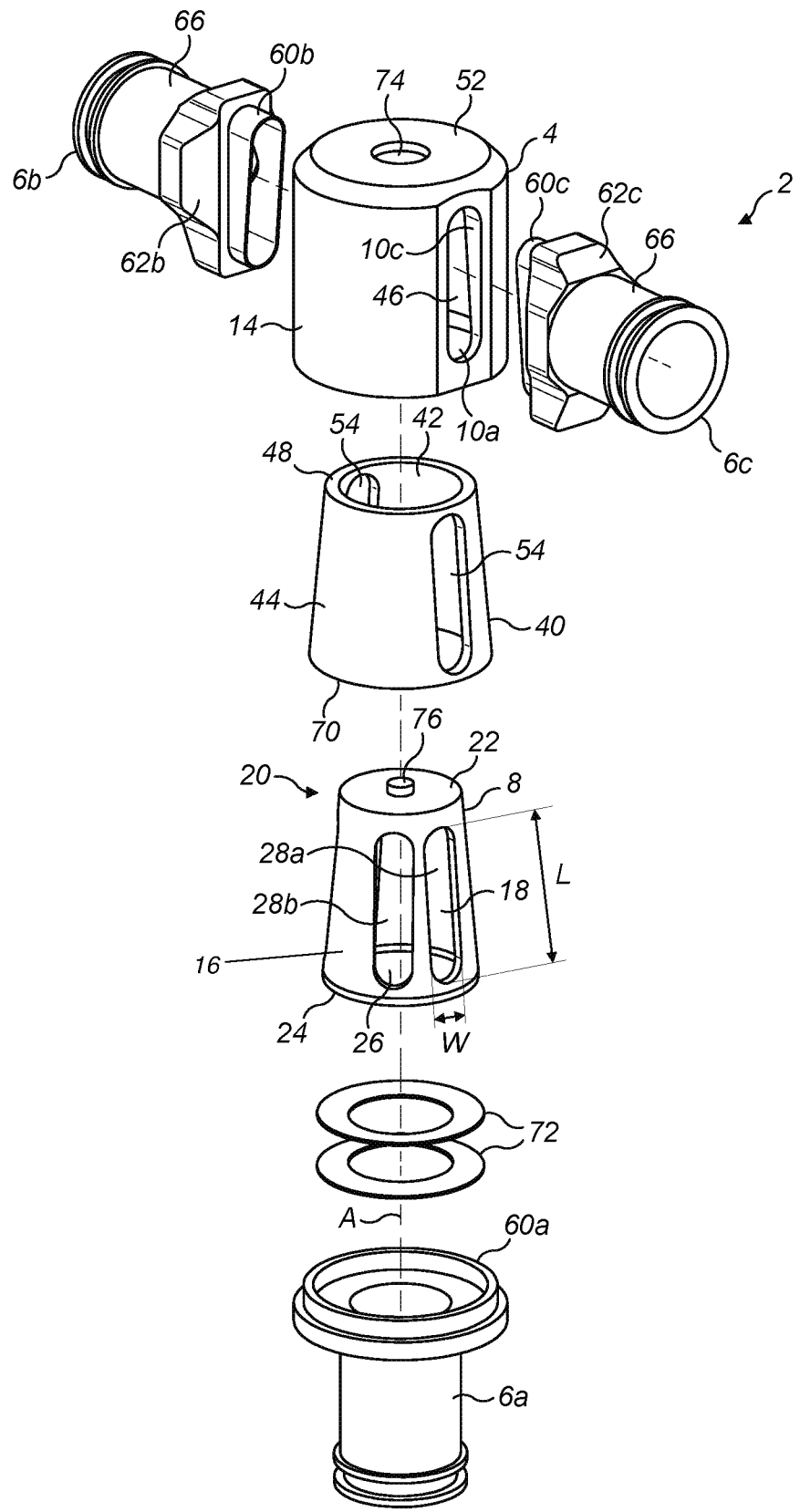
FIG. 2 shows an exploded perspective view of the fluid valve of FIG. 1.
Figure 3:
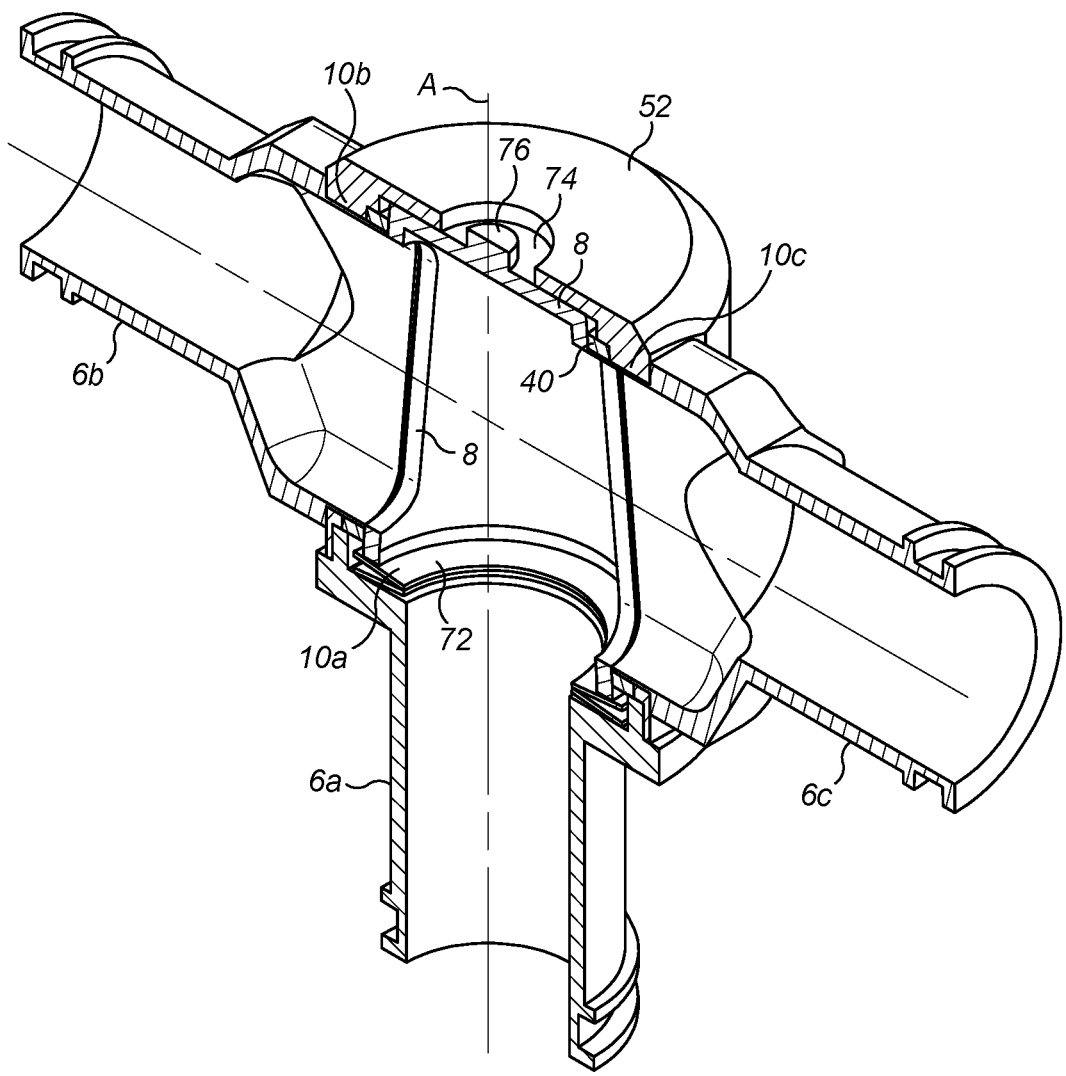
FIG. 3 shows a vertical perspective cross-section of the fluid valve of FIG. 1.
Figure 4:
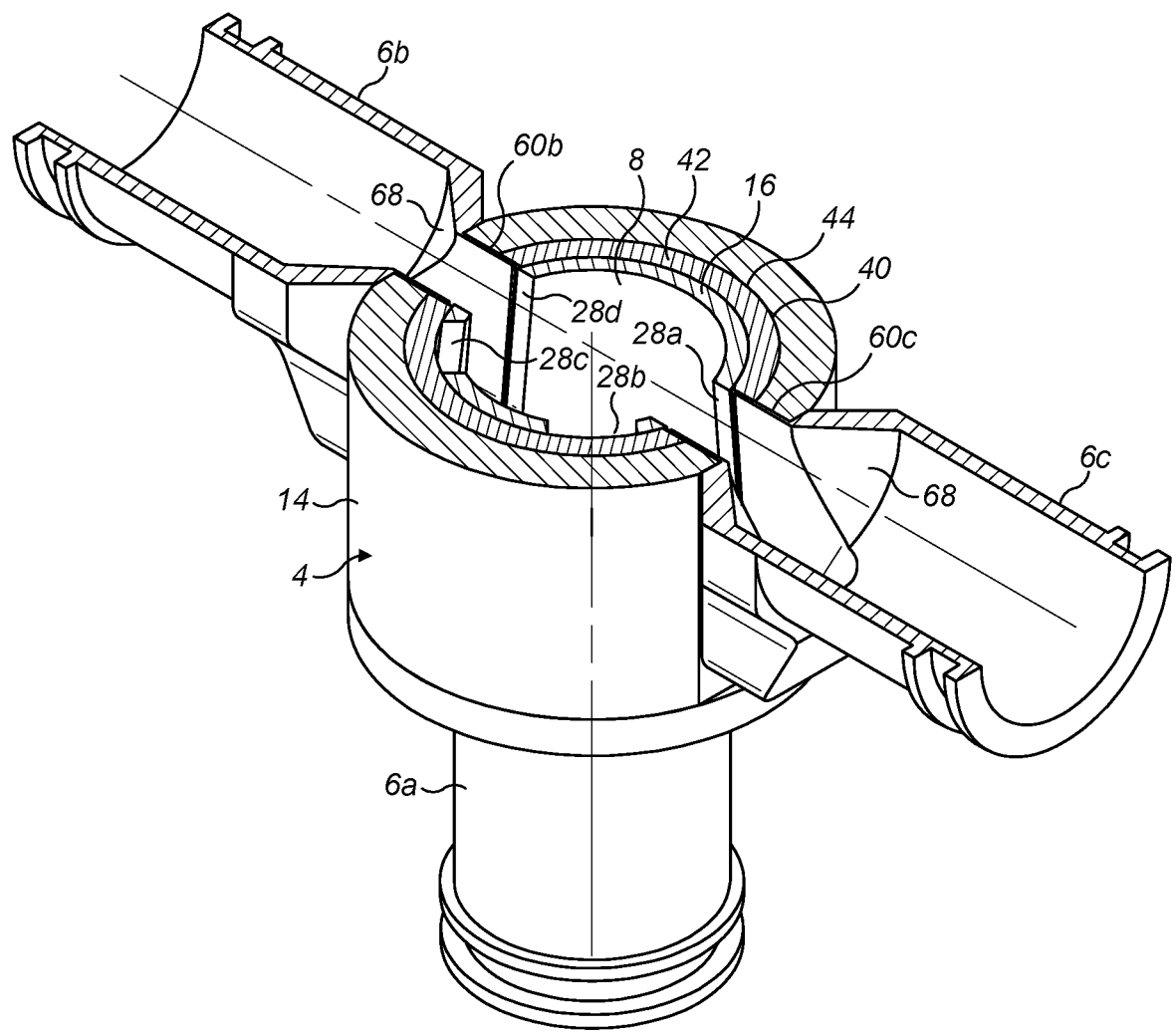
FIG. 4 shows a horizontal perspective cross-section through the fluid valve of FIG. 1.

As can be seen in FIGS. 2 and 3 for example, a rotary valve body 8 is rotationally mounted within the valve housing 4 for selectively distributing fluid entering the inlet connector 6a to the outlet connectors 6b, 6c.

As can be seen from FIGS. 2 and 3 for example, the valve housing 4 defines a longitudinal axis A about which the rotary valve body 8 rotates. The valve housing 4 comprises a fluid inlet 10a at its lower axial end 12, in and, in this embodiment two fluid outlets 10b, 10c. The fluid outlets 10b, 10c are formed in a wall 14 extending circumferentially about the valve axis A. As will be described further below, the respective fluid inlets and outlets 10a, 10b, 10c are in fluid communication with the respective fluid connectors 6a, 6b, 6c. The lower end 12 of the valve housing 4 is closed by the inlet connector 6a.

The rotary valve body 8 is arranged within the valve housing 4 for rotation about the valve axis A. As can be seen from FIG. 2, the rotary valve body 8 comprises a frusto-conical valve body wall 16 which defines an internal chamber 18. The wall 16 may, as shown, have a constant thickness and have generally parallel inner and outer surfaces. In alternative embodiments, the thickness of the wall 16 may vary axially. The upper end 20 of the rotary valve body 8 is closed by a top wall 22 while the bottom end 24 of the rotary valve body 8 is open.

An inlet opening 26 is defined in the bottom end 24 of the valve body 8. As can best be seen in FIG. 6 for example, a plurality (in his embodiment four) outlet openings 28a, 28b, 28c, 28d are formed through the valve body wall 16 for selective rotational alignment or misalignment with the respective valve housing fluid outlets 10b, 10c to allow flow to pass from the valve housing fluid inlet 10a to the housing fluid outlets 10b, 10c via the internal chamber 18 of the valve body 8. In this embodiment, the outlet openings 28a, 28b, 28c, 28d are arranged in pairs, the openings 28a, 28b being associated with the fluid outlet 10b and the openings 28c, 28d being associated with the fluid outlet 10c. In this embodiment the openings 28a, 28d are arranged along a common axis, with the openings 28b, 28c being arranged at an angle of 45 degrees from the openings 28a, 28d respectively. The various operational positions of the valve body 8 will be discussed further below.

The outlet openings 28a, 28b, 28c, 28d in the frusto-conical valve body wall 16 are each formed as a slot which extends in the direction of the valve axis A. Thus, the aspect ratio of each slot, i.e. the ratio of the slot's maximum longitudinal length L to its maximum circumferential width W is greater than 1:1. The aspect ratio may typically be in the range of region of 2:1 to 10:1, for example at least 3:1, for example at least 4:1, for example at least 5:1, depending on the number of outlet openings 28 which are required. The slots optionally have parallel side walls as shown, with optionally arcuate upper and lower ends as shown, so that they resemble an elongated oval or race track in shape. The significance of the slot shaped openings 28 will be discussed further below.

The fluid valve 2 further comprises a sealing element 40 which is interposed between the valve housing 4 and the valve body 8. The sealing element 40 acts to seal the interface between the valve body 8 and the valve housing 4. It may also serve as a bearing to reduce friction between the valve housing and the valve body 8. For this purpose, the sealing element may be made from a low friction material, for example PTFE. Other materials may also provide suitable sealing and bearing properties.

The sealing element 40 in this embodiment is formed as an open ended frusto-conical sleeve. The sealing element has a frusto-conical inner surface 42 for receiving and mating with the frusto-conical valve body wall 16. It also has a frusto-conical outer surface 44 which is received on and mates with a frusto-conical inner surface 46 of the valve housing wall 14. Thus, mating sealing surfaces are formed between the sealing element 40 and the valve body 8 and valve housing 4 respectively.

Figure 5:
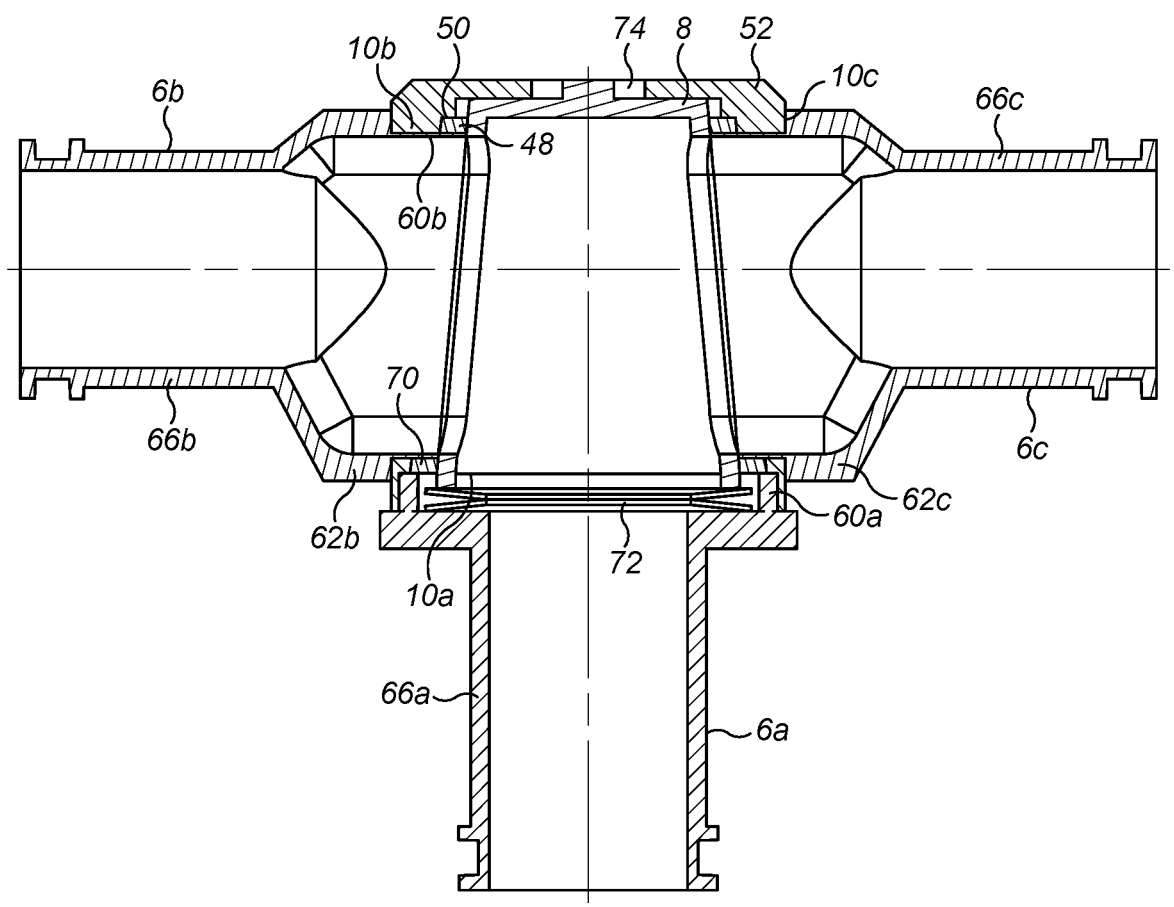
FIG. 5 shows a vertical cross-section through the fluid valve of FIG. 1.

As can best be seen in FIG. 5, the upper end 48 of the sealing element 40 is located within a counterbore 50 formed in an upper wall 52 of the valve housing 4.

As can be seen from FIG. 2, for example, the sealing element 40 has two sealing element openings 54 formed therein. These sealing element openings 54 are in alignment and fluid communication with the valve housing outlets 10b, 10c and have a similar shape and size to the valve body outlet openings 28a . . . 28d.

The outlet connectors 6b, 6c each comprise a lip 60b, 60c extending from a base 62b, 62c of the connector 6b, 6c. The lips 60b, 60c extend through the valve housing outlets 10b, 10c and into the sealing element openings 54. The lips 60b, 60c form a sealing contact with the openings 54. For example the lips 60b, 60c may form a push fit with the openings 54, or may be attached thereto by a sealing adhesive. The connector bases 62b, 62c may be suitably mounted to a receiving pad 64 formed on the valve housing 4 by suitable means such as an adhesive or fastener.

The connectors 6b, 6c each have a shape which morphs from a generally cylindrical section 66b, 66c into the slot-shaped lip sections 60b, 60c. A flaring transition section 68 joins the two sections to minimise pressure losses within the connectors 6b, 6c.

As discussed above, the lower end 12 of the valve housing 4 is closed by an inlet connector 6a. As can be seen in FIG. 5, the inlet connector 6a also comprises a lip 60a extending from a connector base 62a. The lip 60a engages within a bore 10 formed at the lower end 12 of the valve housing 4 and is suitably secured therein to close the lower end 12 of the valve housing 4. For example, the lip 60a and bore 66 may be threaded for threaded engagement, although the connector 6a may be attached with adhesive or fasteners in other embodiments. The lip 60a may be formed integrally with the valve housing 4 or as a separate component which is mounted thereto.

In the disclosed embodiment, the upper end of the lip 60a does not engage with a lower end 70 of the sealing element 40. An additional seal such as a thread sealant or an O-ring may be provided between the mating surfaces of the lip 60a and the lower end of the sealing element 40.

In order to bias the valve body 8 axially upwardly, one or more biasing elements 72, in this embodiment a plurality of annular disc springs 72, are arranged between the connector base 62a and the bottom end 24 of the valve body 8. Other forms of biasing element 72 may be used, if desired. For example in various embodiments, the biasing elements 72 may be coil springs, spring washers, wave springs and so on. The biasing elements 72 are advantageously annular in configuration so not to interrupt the flow of fluid into the valve 2.

The biasing elements 72 bias the valve body 8 axially into the valve housing 4 and into contact with the sealing element 40. This ensures good sealing engagement between the valve body 8 and sealing element 40. The mating frusto-conical surfaces 16, 44 of the valve body 8 and sealing element 40 are complementary in shape such that a good area of contact exists between the valve body 8 and sealing element 40 to maximise the sealing effect.

The biasing elements 72 further act to bias the frusto-conical outer surface 44 of the sealing element 40 into sealing contact with the frusto-conical inner surface 46 of the valve housing wall 14. This ensures good sealing engagement between the sealing element 40 and the valve housing 4. The frusto-conical outer surface 44 of the sealing element 40 and the frusto-conical inner surface 46 of the valve housing wall 14 are complementary in shape such that a good area of contact exists between the sealing element 40 and the valve housing 4 to maximise the sealing effect.

As discussed above, the upper end 48 is received in the counterbore 50 in the valve housing. It may be advantageous if the sealing element 40 does not bottom out in the counterbore 50 during normal operation of the valve 2 in order to ensure that the entire biasing force of the biasing elements 72 is used to induce pressure between the interengaging frustroconical surfaces of the valve housing 4, the sealing element 40, and the valve body 8.

In some embodiments, however, some contact may be allowed between the sealing element 48 and the base of the counterbore 50 to provide a friction limiting mechanism when the pressure (and the associated friction) between the frustroconical surfaces may be abnormally high for proper operation, for example due to environmental conditions (temperature), contamination, abnormal fluid pressure, and so on. In that case, the bottoming out of the sealing element 48 in the counterbore 50 may relieve the friction between the frustroconical surfaces which otherwise may be too high to allow proper rotation of the valve body 8.

In addition, the valve body 8 should not normally engage the upper wall 52 of the valve housing 4 for the same reasons as above.

It will be seen from FIGS. 1 and 3 for example that the upper wall 52 of the valve housing 4 is formed with an opening 74. The upper wall 22 of the valve body 8 is formed with a drive coupling 76, for example a splined coupling, a hexagonal or square coupling, which extends into the opening 74. In alternative embodiments, the coupling 76 may be formed to extend into, rather than from, the upper wall 22 of the valve body 8. This drive coupling 76 is used to couple the valve body to a rotary actuator 78, illustrated schematically in FIG. 1, for rotating the valve body 8.

The actuator 78 may be a rotary actuator such as a rotary solenoid or a rotary stepper motor. Alternatively, the actuator 78 may be a linear actuator coupled to the drive coupling 76 through an appropriate mechanism such as a rack and pinion mechanism.

Having described the general structure of the valve 2, its operation will now be described.

The valve 2 described is one in which the fluid inlet 10*a* is always open and is not closed by the valve body 8. Thus the valve 2 may be used to distribute fluid from a fluid source to one or more selected destinations.

Figure 6:
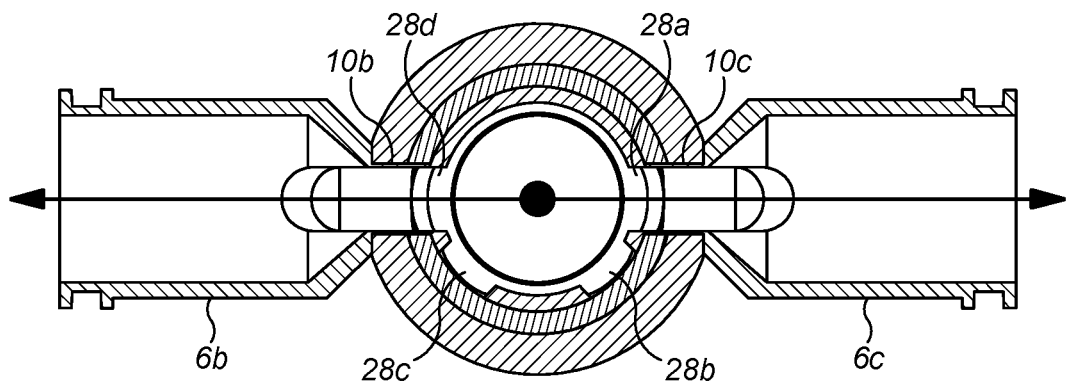
FIG. 6 shows a horizontal cross-section through the fluid valve of FIG. 1 in a first rotational position.
Figure 7:
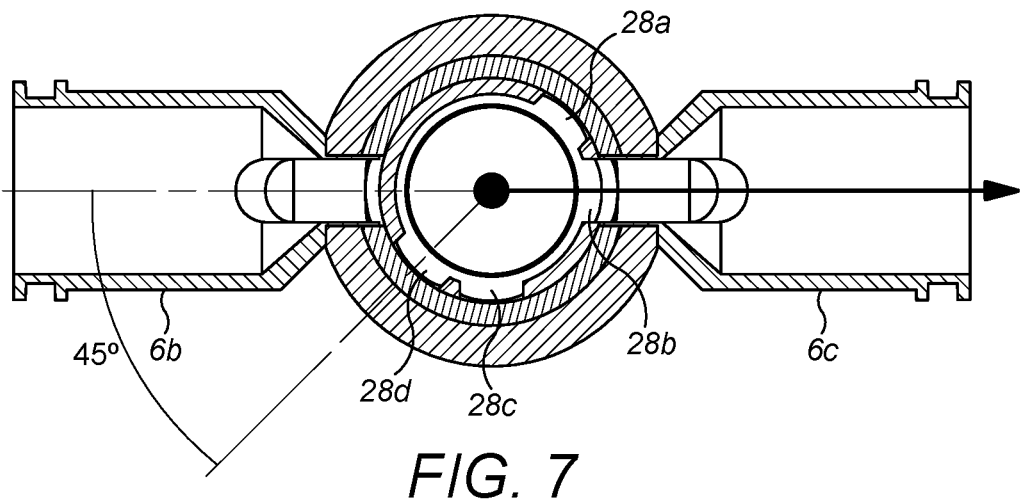
FIG. 7 shows a horizontal cross-section through the fluid valve of FIG. 1 in a second rotational position.
Figure 8:
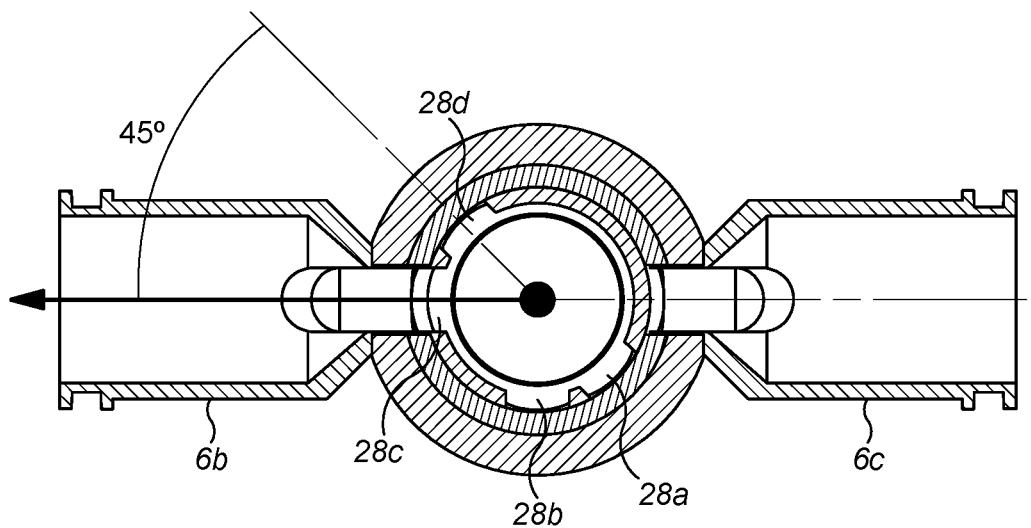
FIG. 8 shows a horizontal cross-section through the fluid valve of FIG. 1 in a third rotational position.

The valve 2 has three positions, illustrated in FIGS. 6 to 8. In the first position shown in FIG. 6, the valve body 8 is arranged with the opposed outlets 28*a*, 28*d* aligned with the valve housing fluid outlets 10*b*, 10*c*. This means that fluid entering the valve 2 through valve housing inlet 10*a* will be evenly distributed to the valve housing outlets 10*b*, 10*c*. As the fluid outlets 28*a*, 28*d* in the valve body 8 are of the same dimensions, the pressure drop across each outlet 28*a*, 28*d* will be the same, allowing the same flow to both fluid outlets 10*b*, 10*c*. In this regard, the cross sectional area of each of the fluid outlets 28*a* . . . 28*d* is advantageously the same as that of the connectors 6*b*, 6*c*. There is therefore no choking of the flow through the valve 2, and the same flow rate may be achieved through the valve as in a traditional ball valve with cylindrical flow passages.

If the valve body is rotated through 45 degrees in a counter clockwise direction, to the position of FIG. 7, fluid outlets 28*a*, 28*d* (which extend circumferentially for less than 45 degrees) move completely out of alignment with the valve housing fluid outlets 10*b* and 10*c*. Valve body outlet 28*c* remains out of alignment with valve housing outlet 10*b*, but valve body fluid outlet 28*b* moves into alignment with valve housing outlet 10*c*. Thus fluid may flow from valve housing inlet 6*a* to valve housing outlet 10*c*.

If, on the other hand, the valve body is rotated through 45 degrees in a clockwise direction from the position shown in FIG. 6, to the position of FIG. 8, fluid outlets 28*a*, 28*d* once again move completely out of alignment with the valve housing fluid outlets 10*b* and 10*c*. Valve body outlet 28*b* remains out of alignment with valve housing outlet 10*c*, but valve body fluid outlet 28*c* moves into alignment with valve housing outlet 10*b*. Thus fluid may flow from valve housing inlet 10*a* to valve housing outlet 10*b*.

Thus with only a rotational movement of 90 degrees, fluid can be selectively routed from inlet 10*a* to either outlet 10*b*, 10*c*. This compares with a required movement of 180 degrees in a traditional ball type valve. Of course the amount of rotation of the valve body needed to bring the valve body fluid outlets 28 into alignment with the valve hosing fluid outlets 10*b*, 1*c* will be determined by the particular configuration of the valve 2. The amount of movement required may be less or more than 45 degrees.

This is made possible by use of the slot shaped outlet openings 28*a* . . . 28*d* in the valve body 8. Due to the slot shape, for the same cross sectional area as a circular opening as is used in a traditional ball valve having cylindrical passages, the openings 28*a* . . . 28*d* may be placed more closely together such that a reduced angular rotation of the valve body 8 may be required to change between operative positions. This is potentially advantageous in a number of respects. Firstly, since a smaller rotational movement may be required, a wider range of actuators may potentially be used. For example relatively small stroke actuators such as rotary solenoids may be used. It also means that a greater number of openings 28*a* . . . 28*d* may be provided in the valve body 8 meaning that fluid may potentially be routed to a larger number of destinations.

Figure 9A:
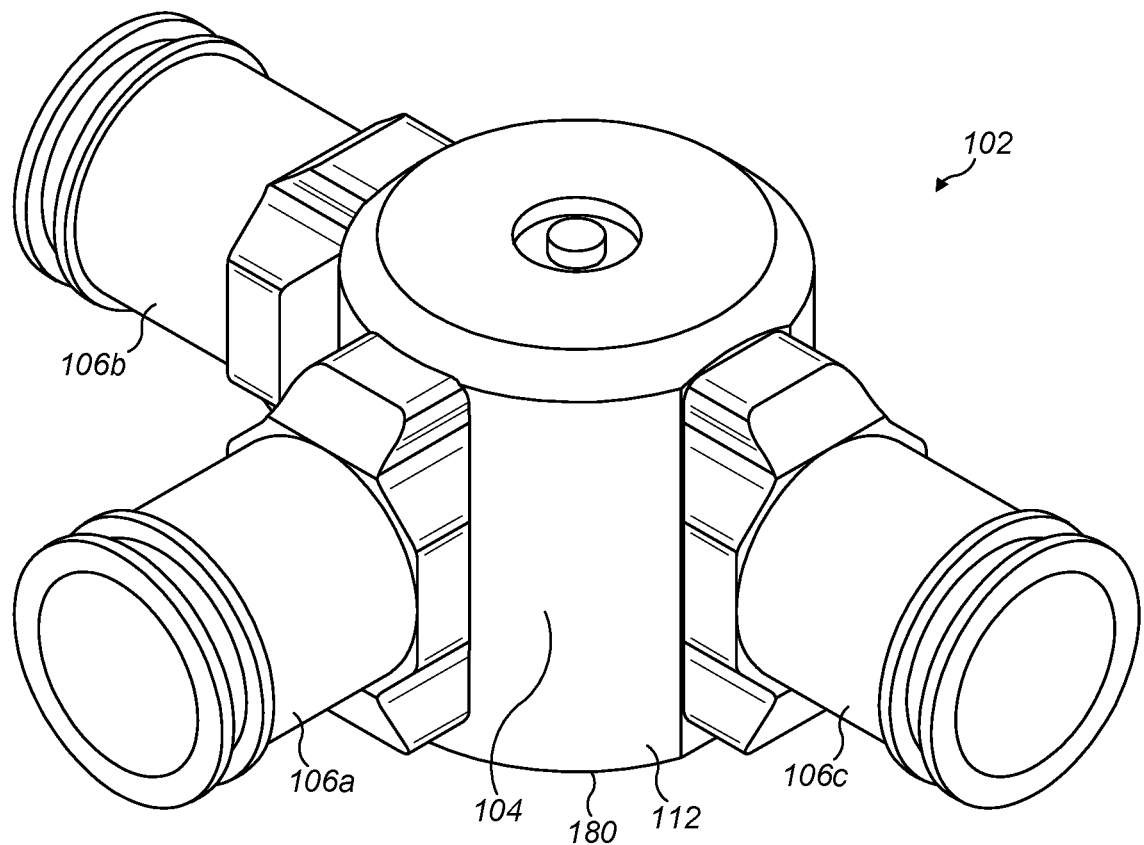
FIG. 9A shows a perspective view of a second three port fluid valve in accordance with the disclosure.

As discussed above, in the embodiment of FIG. 1, the valve housing inlet 10*a* is arranged axially of the valve housing 4. The valve 2 can, however be adapted such that the inlet 10*a* and outlets 10*b*, 10*c* are arranged in the same plane. Such a valve 102 is shown in FIGS. 9A and 9B.

In this embodiment, the lower end 112 of the valve housing 104 may be closed by a cap 180 which acts to retain the biasing elements, valve body 108 and sealing element 140. As can be seen from FIG. 9B, the valve body comprises four openings 128*a*, 128*b*, 128*c*, 128*d* for selectively placing inlet 110*a* into fluid communication with outlets 110*b*, 110*c*.

Figure 9B:
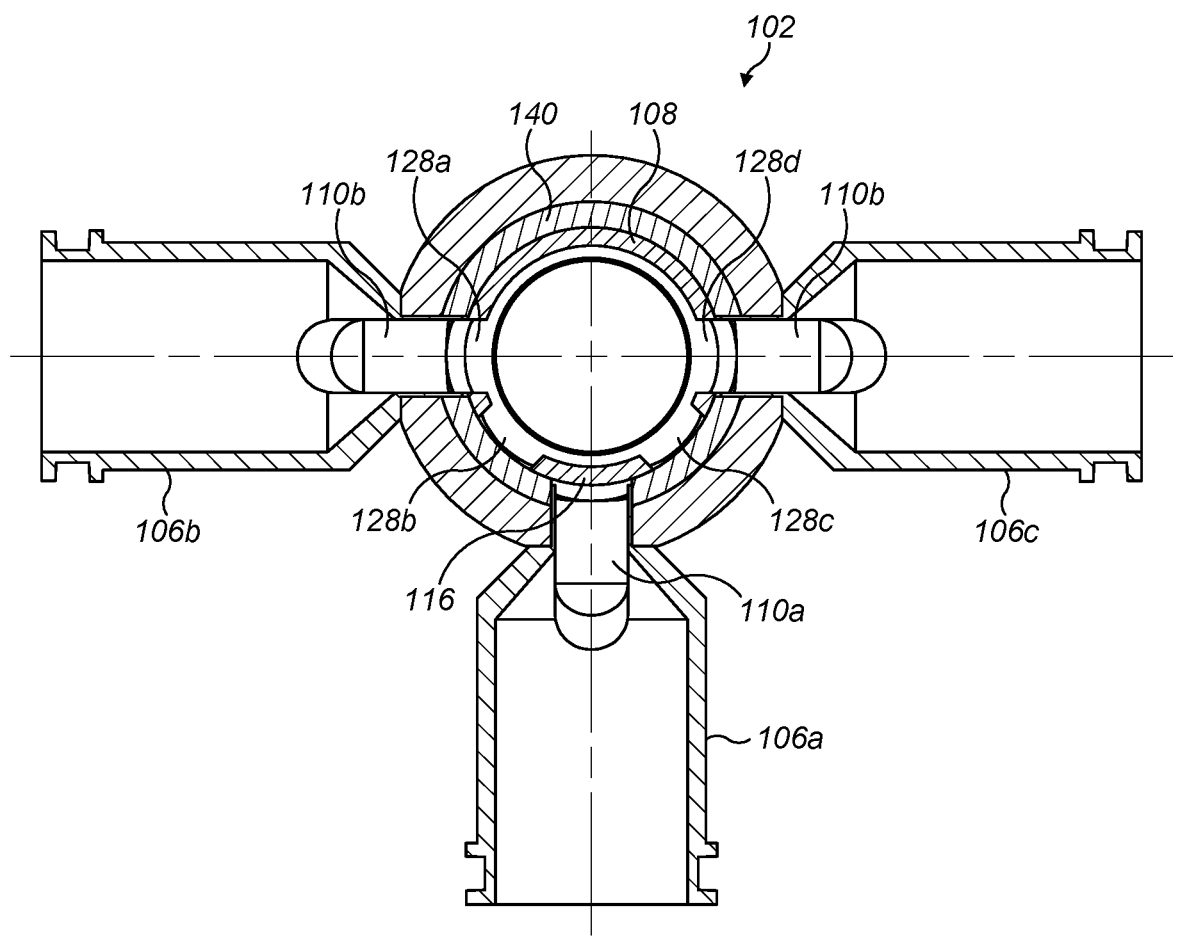
FIG. 9B shows a horizontal cross-section through the fluid valve of FIG. 9A.

In the position shown in FIG. 9B, the valve 102 is in a closed configuration, with a portion of valve body wall 116 closing the inlet 110*a*. If the valve body 108 is rotated 45 degrees clockwise, inlet 110*a* is connected with outlet 110*b* via the openings 128*b*, 128*c*. If the valve body 108 is rotated 45 degrees counter-clockwise, inlet 110*a* will be connected with outlet 110*c* via the openings 128*b*, 128*c*.

Figure 10A:
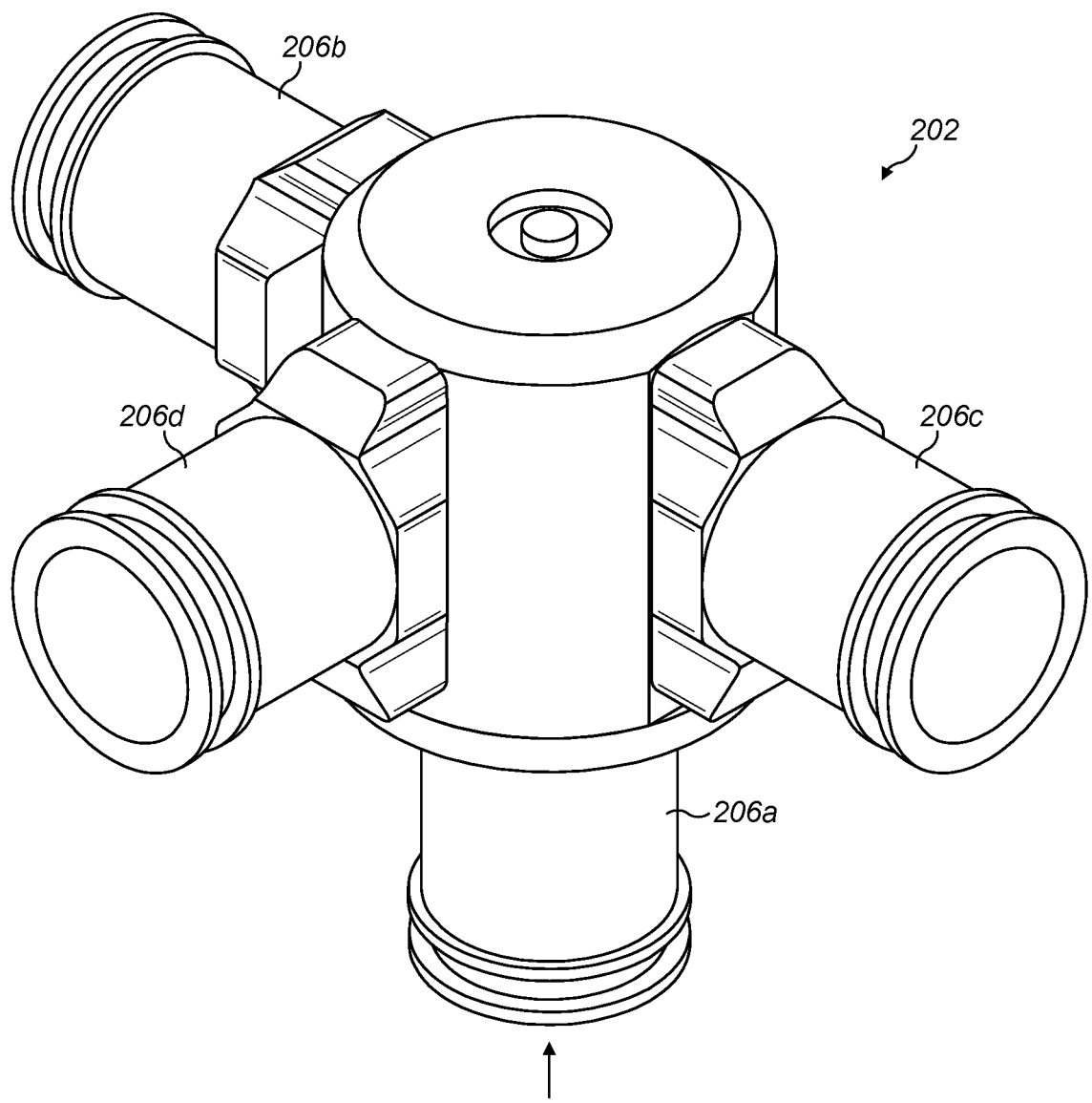
FIG. 10A shows a perspective view of a four port fluid valve in accordance with the disclosure.
Figure 10B:
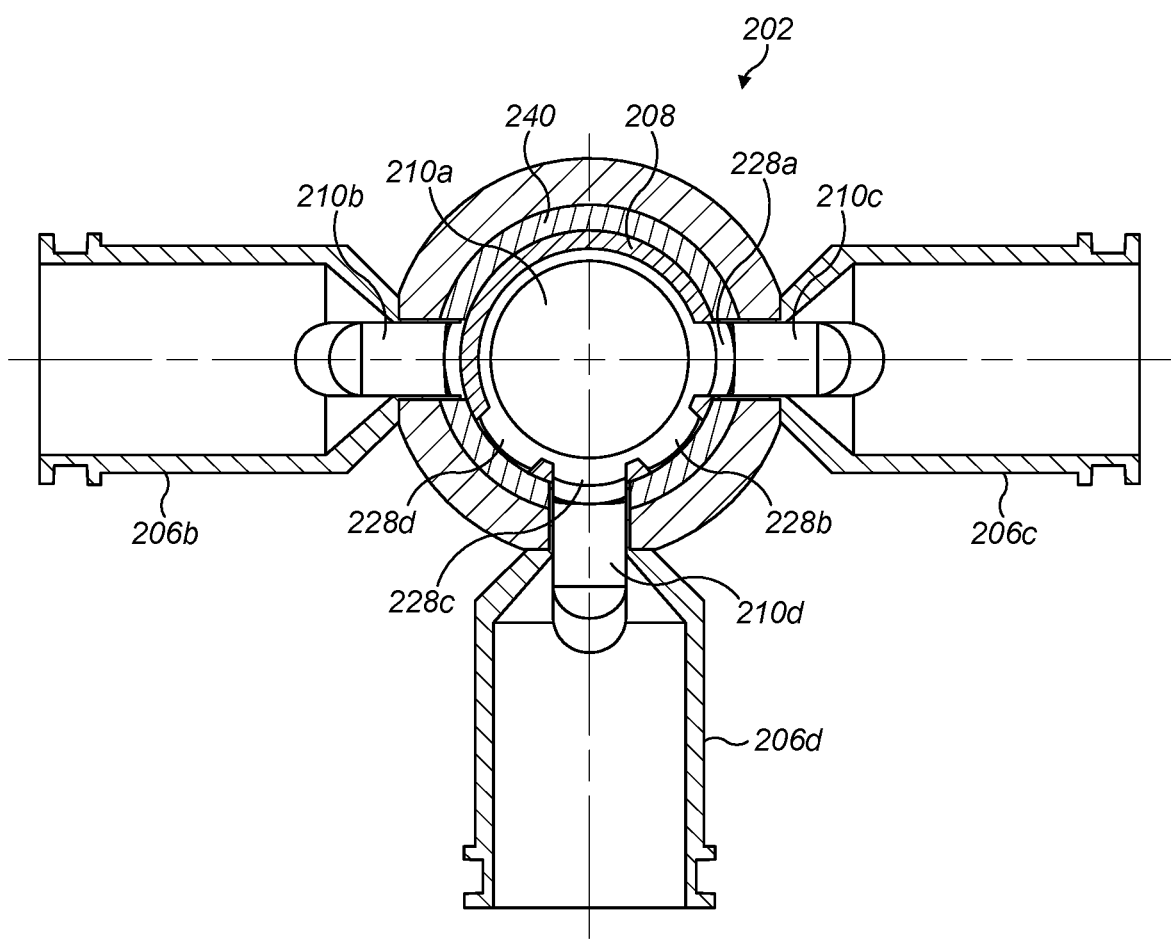
FIG. 10B showed a horizontal cross-section through the fluid valve of FIG. 10A.

Also, while the valve of FIG. 1 shows two fluid outlets 10*b*, 10*c*, more outlets may be provided. Such a valve 202 is illustrated in FIGS. 10A and 10B, where a fluid inlet 210*a* and three fluid outlets 210b, 210c, 210d are provided. Four valve body openings 228a, 228b, 228c and 228d are provided in the valve body 208 for selectively for selectively placing inlet 210a into fluid communication with outlets 210b, 210s, 210d.

In the position shown in FIG. 10B, the inlet 210a is in fluid communication with fluid outlets 210c, 210d via the valve body openings 228a, 228c. If the valve body 108 is rotated 45 degrees clockwise, inlet 210a is connected with fluid outlets 210b, 201d via the valve body openings 228b, 228d.

The particular configuration of inlets and outlets and the number of positions the valve body 208 may adopt can be chosen according to the required flow distribution through the valve 202.

It will be appreciated that a wide range of valve constructions is possible using the principles of the disclosure. Also, assembly of the valve is facilitated by virtue of the nested valve body 8, sealing element 40 and valve housing 4. The sealing element 40 and valve body 8 may simply be inserted into the valve housing 4 from one end, and that end then closed by a cap or connector as appropriate.

The biasing of the valve body 8 against the sealing element 40 both locates the valve body 8 and ensures a good seal between the components. In addition, the sealing element 40 may not only assure good sealing within the valve 2, but may also act as a bearing for the valve body 8.

The materials of the various valve components may be chosen to suit any particular application. For example, the valve housing 4 and valve body 8 may be metallic, for example stainless steel or aluminium. Similarly the disc springs 60 may be metallic, for example stainless steel. The sealing element 40 may be made from a polymeric material, for example PTFE.

It will be appreciated that the embodiments described above are merely exemplary, and the skilled person will recognise that various modifications may be made thereto without departing from the scope of the disclosure.

The invention claimed is:

1. A fluid valve comprising:
   a valve housing having a fluid inlet and at least two fluid outlets and having a valve axis, the at least two fluid outlets being arranged in a circumferential wall extending circumferentially about the valve axis; and
   a rotary valve body arranged within the valve housing for rotation about the valve axis;
      wherein the rotary valve body comprises a frusto-conical valve body wall, an open first end, and an closed second end that define an internal chamber, the open first end located adjacent the fluid inlet of the valve housing, and a plurality of circumferentially spaced openings in the frusto-conical valve body wall, the rotary valve body being rotatable about the valve axis so as selectively to place one or more of the at least two fluid outlets of the valve housing into fluid communication with the fluid inlet via one or more of the plurality of circumferentially spaced openings in the valve body wall and the internal chamber of the rotary valve body;
      wherein the open first end has a first diameter that is greater than a second diameter of the closed second end;
      wherein the valve housing fluid inlet is not closable by the valve body; and
      wherein the plurality of circumferentially spaced openings includes a first opening, a second opening positioned 45 degrees from the first opening about the valve axis, a third opening positioned 135 degrees from the first opening about the valve axis, and a fourth opening positioned 180 degrees from the first opening about the valve axis.

2. The fluid valve as claimed in claim 1, comprising respective cylindrical fluid connectors mounted to the valve housing inlet and the outlets for conducting fluid to and from the valve housing, wherein a cross sectional flow area of a respective connector is substantially the same as a cross sectional area of the corresponding valve body opening.

3. The fluid valve as claimed in claim 2, wherein each of the fluid connectors extends through the valve housing wall and into sealing engagement with a corresponding opening in the sealing element.

4. The fluid valve as claimed in claim 1, wherein a biasing element is mounted between the valve housing inlet and one end of the rotary valve body, and wherein the biasing element comprises one or more annular springs.

5. The fluid valve as claimed in claim 1, wherein an upper end of the sealing element is located within a counterbore formed in an upper wall of the valve housing.

6. A fluid valve comprising:
   a valve housing having a fluid inlet and at least two fluid outlets and having a valve axis, the at least two fluid outlets being arranged in a circumferential wall extending circumferentially about the valve axis;
   a rotary valve body arranged within the valve housing for rotation about the valve axis;
      wherein the rotary valve body comprises a frusto-conical valve body wall, an open first end, and a closed second end that define an internal chamber, the open first end located adjacent and axially aligned with the fluid inlet of the valve housing, and a plurality of circumferentially spaced openings in the frusto-conical valve body wall, the rotary valve body being rotatable about the valve axis so as selectively to place one or more of the at least two fluid outlets of the valve housing into fluid communication with the fluid inlet via one or more of the plurality of circumferentially spaced openings in the valve body wall and the internal chamber of the rotary valve body;
   wherein the plurality of circumferentially spaced openings includes a first opening, a second opening positioned 45 degrees from the first opening about the valve axis, a third opening positioned 135 degrees from the first opening about the valve axis, and a fourth opening positioned 180 degrees from the first opening about the valve axis,
   wherein the open first end has a first diameter that is greater than a second diameter of the closed second end; and
   a sealing element interposed between the valve housing and the valve body wall, such that the sealing element is separable from the valve housing and the valve body.

7. The fluid valve as claimed in claim 6, comprising respective cylindrical fluid connectors mounted to the valve housing inlet and the outlets for conducting fluid to and from the valve housing, wherein a cross sectional flow area of a respective connector is substantially the same as a cross sectional area of the corresponding valve body opening, and wherein each of the fluid connectors extends through the valve housing wall and into sealing engagement with a corresponding opening in the sealing element.

* * * * *